United States Patent
Veltrop et al.

(10) Patent No.: US 8,404,292 B2
(45) Date of Patent: Mar. 26, 2013

(54) APPARATUS AND METHOD FOR MAINTAINING COOKED FOOD IN A READY-TO-USE CONDITION

(75) Inventors: Loren J. Veltrop, Chicago, IL (US); Jeffrey Schroeder, Lake Zurich, IL (US); Charles Hartfelder, Carol Stream, IL (US); Jack Guasta, Glendale Heights, IL (US)

(73) Assignee: Prince Castle, Inc., Carol Stream, IL (US)

( * ) Notice: Subject to any disclaimer, the term of this patent is extended or adjusted under 35 U.S.C. 154(b) by 0 days.

(21) Appl. No.: 13/325,543

(22) Filed: Dec. 14, 2011

(65) Prior Publication Data
US 2012/0079699 A1    Apr. 5, 2012

Related U.S. Application Data

(62) Division of application No. 12/029,946, filed on Feb. 12, 2008, now Pat. No. 8,096,231.

(51) Int. Cl.
*A47J 39/00* (2006.01)
*A47J 36/24* (2006.01)

(52) U.S. Cl. ............ 426/418; 219/385; 219/386; 99/483

(58) Field of Classification Search .................. 219/385, 219/386, 394, 395, 399, 400; 126/333, 337 R; 473/400
See application file for complete search history.

(56) References Cited

U.S. PATENT DOCUMENTS

| | | | |
|---|---|---|---|
| 3,751,629 A * | 8/1973 | Eisler ............................ 219/201 |
| 5,783,803 A * | 7/1998 | Robards, Jr. .................. 219/392 |
| 5,900,173 A | 5/1999 | Robards, Jr. |
| 6,116,154 A * | 9/2000 | Vaseloff ......................... 99/483 |
| 6,175,099 B1 | 1/2001 | Shei et al. |
| 6,262,394 B1 | 7/2001 | Shei et al. |
| 6,412,403 B1 | 7/2002 | Veltrop |
| 6,541,739 B2 | 4/2003 | Shei et al. |
| 6,637,322 B2 * | 10/2003 | Veltrop .......................... 99/483 |
| 6,878,391 B2 | 4/2005 | Veltrop |
| 6,884,451 B2 | 4/2005 | Veltrop |
| 7,105,779 B2 * | 9/2006 | Shei ............................ 219/413 |
| 7,227,102 B2 | 6/2007 | Shei |
| 7,328,654 B2 * | 2/2008 | Shei ............................ 99/468 |
| 7,385,160 B2 * | 6/2008 | Jones ........................... 219/386 |
| 7,762,636 B2 * | 7/2010 | Veeser et al. ................ 312/330.1 |
| 7,858,906 B2 * | 12/2010 | Veltrop et al. ................ 219/385 |

(Continued)

OTHER PUBLICATIONS

Prince Castle, Inc., Operating Instructions, Dedicated Holding Bin, DHB2-20 Series, 2006.

(Continued)

*Primary Examiner* — Henry Yuen
*Assistant Examiner* — Jianying Atkisson
(74) *Attorney, Agent, or Firm* — McDonnell Boehnen Hulbert & Berghoff LLP

(57) ABSTRACT

A food warming apparatus includes a heating compartment that can hold one or more trays containing previously cooked food portions. A cover for a tray has a horizontal section and a vertical section extending downwardly from one side of the horizontal section. A rack in the heating compartment includes a channel and a stop that blocks the front end of the channel. The vertical section of the cover fits securely in the channel behind the stop such that the rack supports the cover substantially only through the vertical section. When a tray is inserted into the receiving space cooperatively defined by the cover and rack, the cover is lifted up so that the horizontal section rests on the tray and at least partially blocks the open top of the tray, thereby restricting evaporation of liquids from the previously cooked food portions contained in the tray.

6 Claims, 9 Drawing Sheets

U.S. PATENT DOCUMENTS

| | | | |
|---|---|---|---|
| 8,091,472 B2 * | 1/2012 | Maciejewski et al. | 99/483 |
| 8,096,231 B2 * | 1/2012 | Veltrop et al. | 99/483 |
| 2001/0007322 A1 | 7/2001 | Shei et al. | |
| 2002/0121509 A1 | 9/2002 | Shei et al. | |
| 2003/0118706 A1 | 6/2003 | Veltrop | |
| 2008/0302778 A1 | 12/2008 | Veltrop et al. | |
| 2009/0266244 A1 | 10/2009 | Maciejewski et al. | |

OTHER PUBLICATIONS

Prince Castle, Inc., Product Specifications, DHB2PT-20 Dedicated Holding Bin, 2006.

* cited by examiner

APPARATUS AND METHOD FOR MAINTAINING COOKED FOOD IN A READY-TO-USE CONDITION

CROSS-REFERENCE TO RELATED APPLICATIONS

This application is a division of U.S. patent application Ser. No. 12/029,946, filed Feb. 12, 2008, which application is incorporated herein by reference.

BACKGROUND OF THE INVENTION

1. Field of the Invention

This invention relates to the field of food preparation. More particularly, this invention relates to an apparatus and method for maintaining in a ready-to-use condition cooked food portions contained in a food tray, wherein a cover comprising a horizontal section and a vertical section is used to cover the food trays.

2. Description of Related Art

In many establishments, such as fast food restaurants, certain food items are cooked well in advance of when they are ordered by or served to the customer. Examples of such food items can include sandwich fillings, such as cooked eggs, hamburger patties, breaded foods, such as chicken nuggets, or baked goods, such as muffins. These previously cooked food items are often maintained in a ready-to-use condition until they served to the customer. This typically involves maintaining the previously cooked food items at a serving temperature in the range of from about 140° F. to about 200° F., depending on the food item.

Various food warming apparatus have been developed to maintain previously cooked food items at a desired serving temperature. Such food warming apparatus are sometimes referred to as staging cabinets, holding cabinets, or warming cabinets. One of the challenges associated with food warming apparatus is being able to preserve the flavor, appearance, and texture of the previously cooked food items while they are being maintained at the desired serving temperature. In particular, certain types of food items, such as cooked eggs and hamburger patties have a tendency to dry out undesirably when they are kept warm for extended periods of time.

One commonly used way to protect previously cooked food items for which drying out is a concern, is to place the food items in a container, such as a tray, and to provide a cover for the container. The cover restricts evaporation of moisture from the previously cooked food items. With a reduced amount of moisture vapor being able to escape from the covered container, the previously cooked food items contained therein do not dry out as rapidly.

Conventional covers are inconvenient to use in food fast restaurants and similar establishments. This is because when previously cooked food portions are taken from the food warming apparatus, the cover typically must be removed from the tray to gain access to the food items contained therein, and must be replaced to protect the remaining food portions contained in the tray. The steps of removing and replacing a cover can take an amount of time that is unacceptably large in fast food restaurants. The removed cover can also become misplaced or contaminated and can get in the way of other activities in the kitchen area.

SUMMARY

In a first principal aspect, an exemplary embodiment provides a food warming apparatus for maintaining previously cooked food portions contained in at least one tray in a ready-to-use condition. The at least one tray has a lip defining a tray opening. The food warming apparatus comprises a cabinet having at least one heating compartment therein. A rack is disposed in the at least one heating compartment. At least one cover has a horizontal section and a vertical section extending downwardly from one side of the horizontal section. The at least one cover is removably mounted on the rack such that the rack supports the at least one cover substantially only through the vertical section. The at least one cover and at least one support member cooperatively define at least one receiving space for receiving the at least one tray.

In a second principal aspect, an exemplary embodiment provides a method for covering a tray in a food warming apparatus. The food warming apparatus includes a heating compartment. The tray has a lip defining a tray opening. In accordance with the method, a rack that fits into the heating compartment is provided. A cover for the tray is provided. The cover has a horizontal section and a vertical section extending downwardly from one side of the horizontal section. The cover is mounted on the support such that the rack supports the cover substantially only through the vertical section. The tray is inserted into a receiving space cooperatively defined by the cover and the rack until the horizontal section of the cover rests on the lip of the tray and at least partially blocks the tray opening.

DETAILED DESCRIPTION

1. Overview

Figure 1:
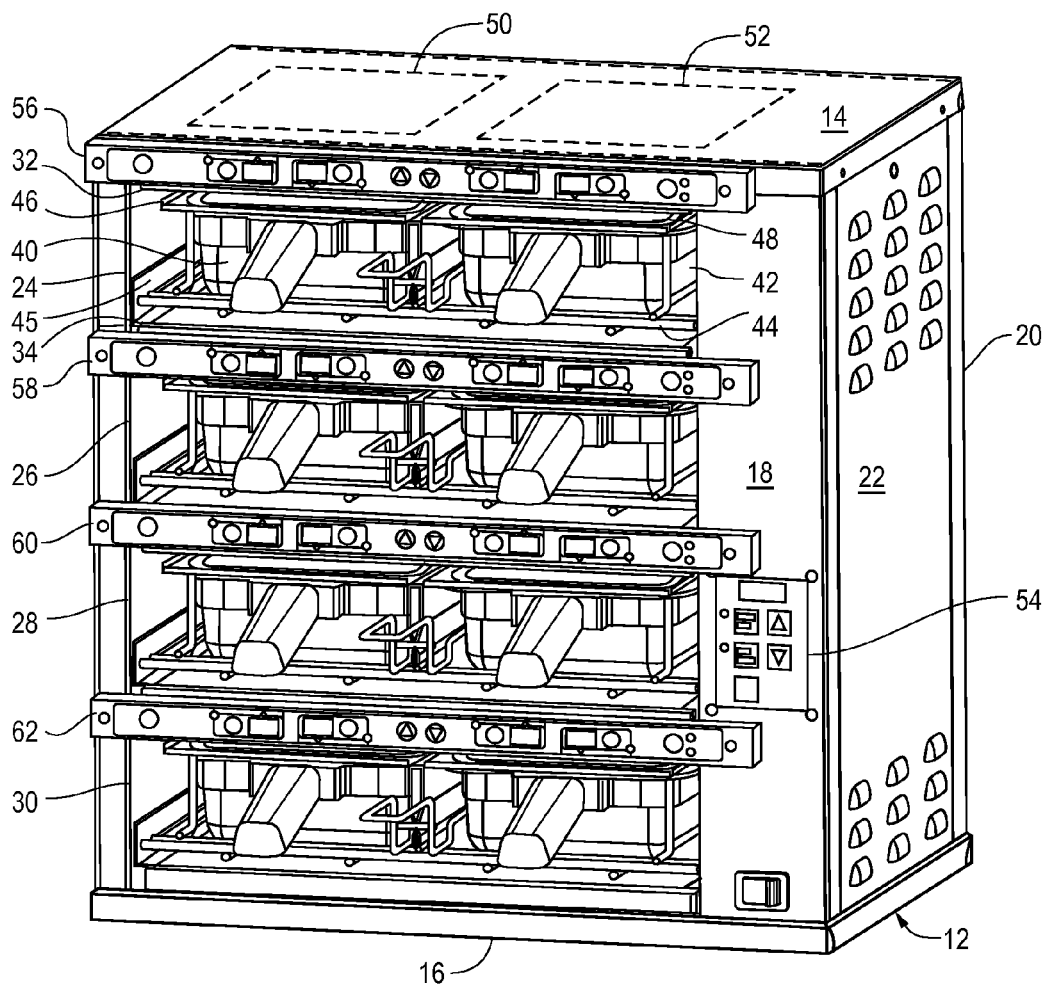
FIG. 1 is an isometric view of a food warming apparatus, in accordance with an exemplary embodiment.

A food warming apparatus is able to maintain previously cooked food portions in a ready-to-use condition. The previously cooked food portions may be placed in one or more open-top containers, which are referred to herein as "trays." The trays containing the previously cooked food portions may be placed in one or more heating compartments to maintain the portions at a desired temperature. Covers may cover some or all of the trays in the heating compartments so as to restrict evaporation of moisture or other liquid from the previously cooked food portions.

One or more support structures may be placed in the heating compartments to support covers independently of the trays. Thus, a tray may be covered by inserting it into a heating compartment, in which a cover that is supported by a support structure is already in place. In addition, one or more stops may be used to retain the covers in the heating compartments. That way, when a tray is withdrawn from a heating compartment, the cover stays inside the compartment.

The support structure used to support the cover may include a rack. The rack may include a frame and a plurality of channel members that extend between the front of the frame and the back of the frame. Two adjacent channel members may define a channel therebetween that can be used to support a cover within the heating compartment. In particular, the cover may have a horizontal section and a vertical section that extends downwardly from one side of the horizontal section. The vertical section may be securely fitted into the channel so that the rack supports the cover substantially only through the vertical section of the cover. For example, the channel may be only slightly wider than the thickness of the vertical section. That way, the channel can substantially prevent the vertical section from moving in a side-to-side direction while still allowing the vertical section to move in a vertical direction. Further, a bar that blocks the front end of the channel may function as a stop that retains the cover in the heating compartment when the tray is removed.

In this arrangement, the cover and the rack cooperatively define a receiving space for receiving a tray. Thus, a tray containing previously cooked food portions may be placed in the heating compartment by inserting it into the receiving space. When the tray is fully inserted, the horizontal section of the cover at least partially blocks the open top of the tray, so as to restrict evaporation of liquid from the previously cooked food portions contained in the tray.

In an exemplary embodiment, the insertion of the tray into the receiving space moves the cover upwardly. In particular, before the tray is inserted into the receiving space, the vertical section may be disposed in the channel in a lower position in which the vertical section rests on the frame. However, the height of the tray may exceed the height of the receiving space. As a result, when the tray is inserted into the receiving space, the cover may move upwardly so that the vertical section moves to an upper position above the frame and the horizontal section rests on the tray. When the tray is subsequently removed, the vertical section returns to the lower position in the channel.

Although the rack can support a cover substantially only on one side, i.e., through the vertical section of the cover, it is to be understood that one or more additional support structures may be used to provide additional support for the cover. For example, a rack may be used to support one side of the cover (e.g., through the vertical section) and a support member separate from the rack may be used to support the opposite side of the cover (e.g., through the horizontal section).

Configuring the covers so that they stay in the heating compartment can provide benefits for establishments such as fast food restaurants. In particular, a tray containing previously cooked food portions may be inserted into the heating compartment and covered in one step, and the tray may be withdrawn from the heating compartment and uncovered in one step, thereby saving time. In addition, the inconvenience and the possibilities of contamination associated with direct handling of covers can be reduced.

2. Exemplary Food Warming Apparatus

With reference to FIG. 1, an exemplary food warming apparatus 10 includes a housing or cabinet 12 that has a top 14, a bottom 16, a front 18, a back 20, and sides 22. The interior of cabinet 12 is divided into heating compartments 24, 26, 28, and 30. Although FIG. 1 shows exemplary food warming apparatus 10 with four heating compartments, it is to be understood that a food warming apparatus could be provided with a greater or fewer number of heating compartments.

In the example shown in FIG. 1, front 18 is open to provide access to compartments 24, 26, 28, and 30. However, it is to be understood that back 20 could also be open to provide access to compartments 24, 26, 28, and 30, for example, in a pass-through configuration. Each of compartments 24, 26, 28, and 30 includes an upper compartment surface and a lower compartment surface. Thus, compartment 24 includes an upper compartment surface 32 and a lower compartment surface 34, as shown in FIG. 1. Compartments 26, 28, and 30 may be similarly configured.

Each of compartments 24, 26, 28, and 30 is sized to accommodate one or more trays, as exemplified in FIG. 1 by trays 40 and 42 in compartment 24. Although FIG. 1 shows two trays in each compartment, it is to be understood that the compartments may be sized to accommodate a greater or fewer number of trays. In addition, although FIG. 1 shows each compartment filled with its maximum number of trays, it is to be understood that a compartment might hold less than the maximum number of trays at any given time.

In each compartment, trays may be supported by a support structure such as a rack. For example, FIG. 1 shows trays 40 and 42 in compartment 24 supported by a rack 44. The rack may be mounted in the compartment in various ways. For example, a rack could rest on lower compartment surface 34. Alternatively, a rack could be supported above lower compartment surface 34. In the example illustrated in FIG. 1, the rack in each compartment is supported above the lower compartment surface by mounting brackets disposed on the side walls of the compartment. Thus, compartment 24 is shown with mounting brackets 45 supporting rack 44.

Covers may cover some or all of the trays in the compartments. For example, trays 40 and 42 in compartment 24 may be covered by covers 46 and 48, respectively. The operational relationship between trays 40 and 42, rack 44, and covers 44 and 46 is described in more detail below.

Each of compartments 24, 26, 28, and 30 may be heated by a respective heating system. In an exemplary embodiment, each heating system includes one or more resistive heaters for heating its respective compartment from above and/or from below. For example, compartment 24 may be heated through upper compartment surface 32 by heater plates 50 and 52, which may be positioned over trays 40 and 42, respectively. Compartment 24 may also be heated through lower compartment surface 34 by similar heater plates. Compartments 26, 28, and 30 may be heated in a similar manner.

Food warming apparatus 10 may include various controls for enabling an operator to control its operation and various indicators for displaying information to the operator. Some of the controls and indicators may be arranged in a control panel 54 disposed on front 18. Other controls and indicators may be arranged in interface bars 56, 58, 60, and 62, associated with compartments 24, 26, 28, and 30, respectively.

Control panel 54 may enable the operator to select setpoint temperatures for the compartments (or for specific trays in the compartments). A control system in food warming apparatus 10 may control the heating systems for the compartments (e.g., thermostatically) so as to achieve and maintain the setpoint temperatures. In an exemplary embodiment, the control system may measure the temperature at the heating system (e.g., at heater plate 50 or 52), so that the setpoint temperature corresponds to the temperature at the heating system. The temperature of the food inside of the covered tray in the compartment may be lower than the setpoint temperature. For example, it may be desirable to maintain previously cooked food portions at a temperature that may range from about 140° F. to about 200° F. To achieve this food temperature, the setpoint temperature may need to be as high as 400° F.

Interface bars 56, 58, 60, and 62 may each enable an operator to select a hold time for the respective compartment (or for a specific tray in the compartment) based, for example, on the particular food product contained in the compartment (or contained in a specific tray in the compartment). The operator may select the hold time by scrolling through a list of food products, each of which has been associated with a preset hold time. A display on the interface bar may display descriptions of the food products as the operator scrolls through the list and may then display a description of the selected food product.

When the selected food product is placed in the compartment, the operator may interact with the compartment's interface bar to start a timer. When the hold time has been reached, the compartment's interface bar may provide an indication to the operator. The operator may then replace the food product with fresh food product and interact with the interface bar to re-set the timer.

3. Exemplary Rack

Figure 2:
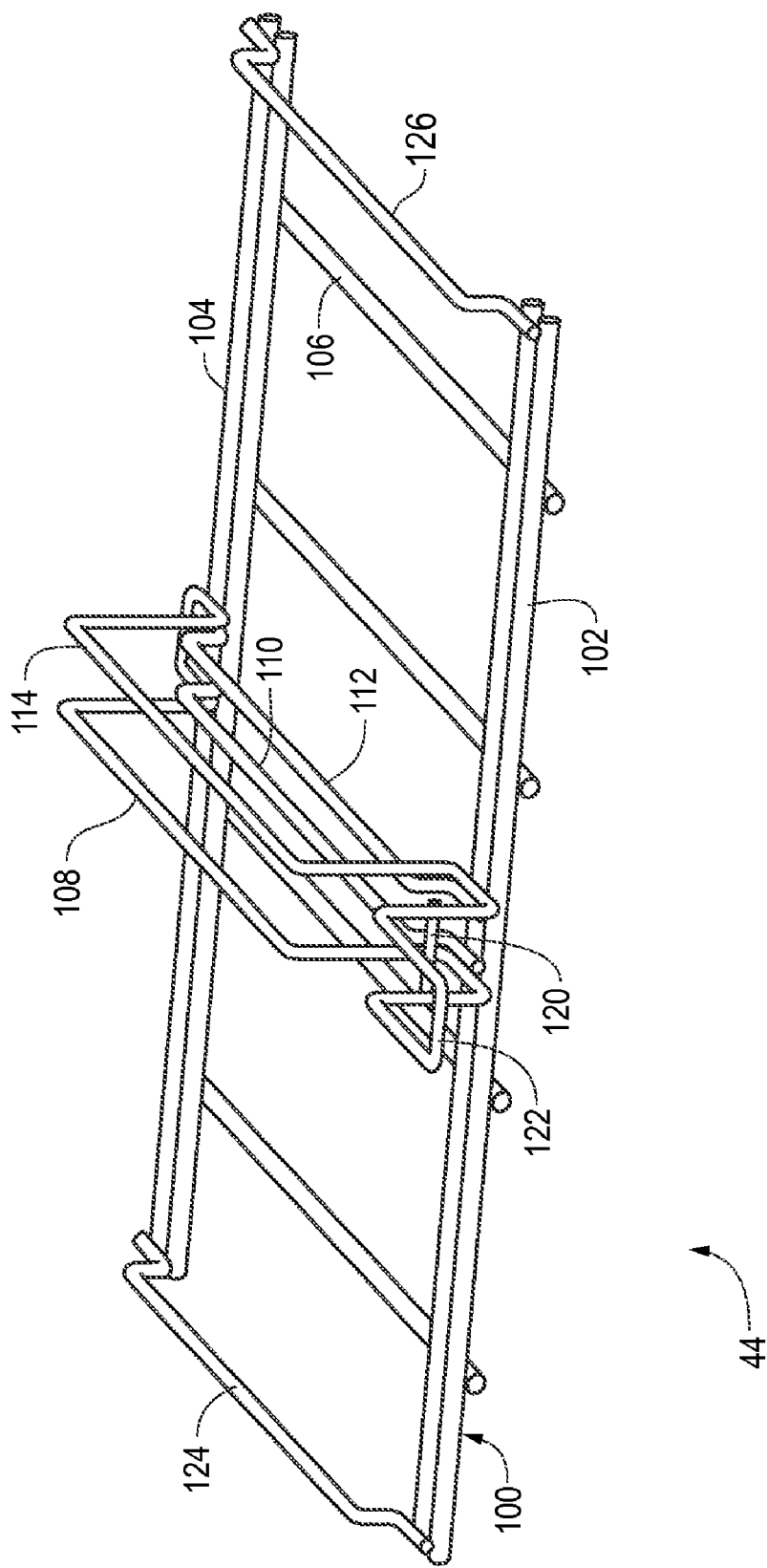
FIG. 2 is an isometric view of a rack, in accordance with an exemplary embodiment.
Figure 3:
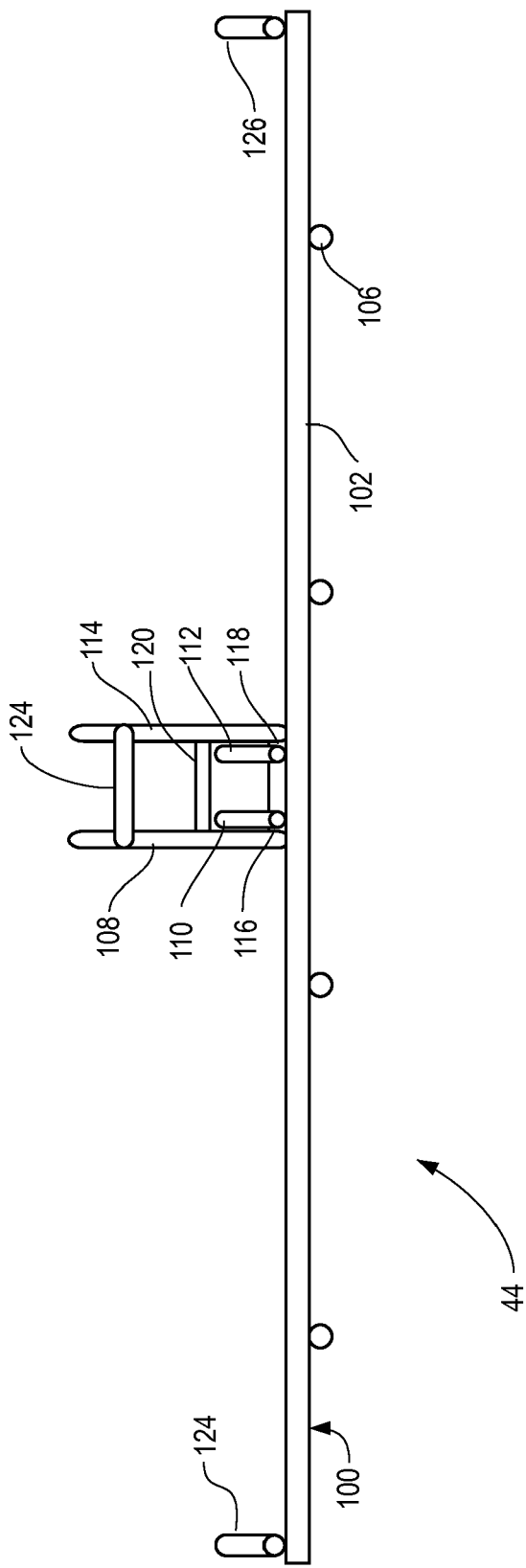
FIG. 3 is a front view of the rack of FIG. 2, in accordance with an exemplary embodiment.
Figure 4:
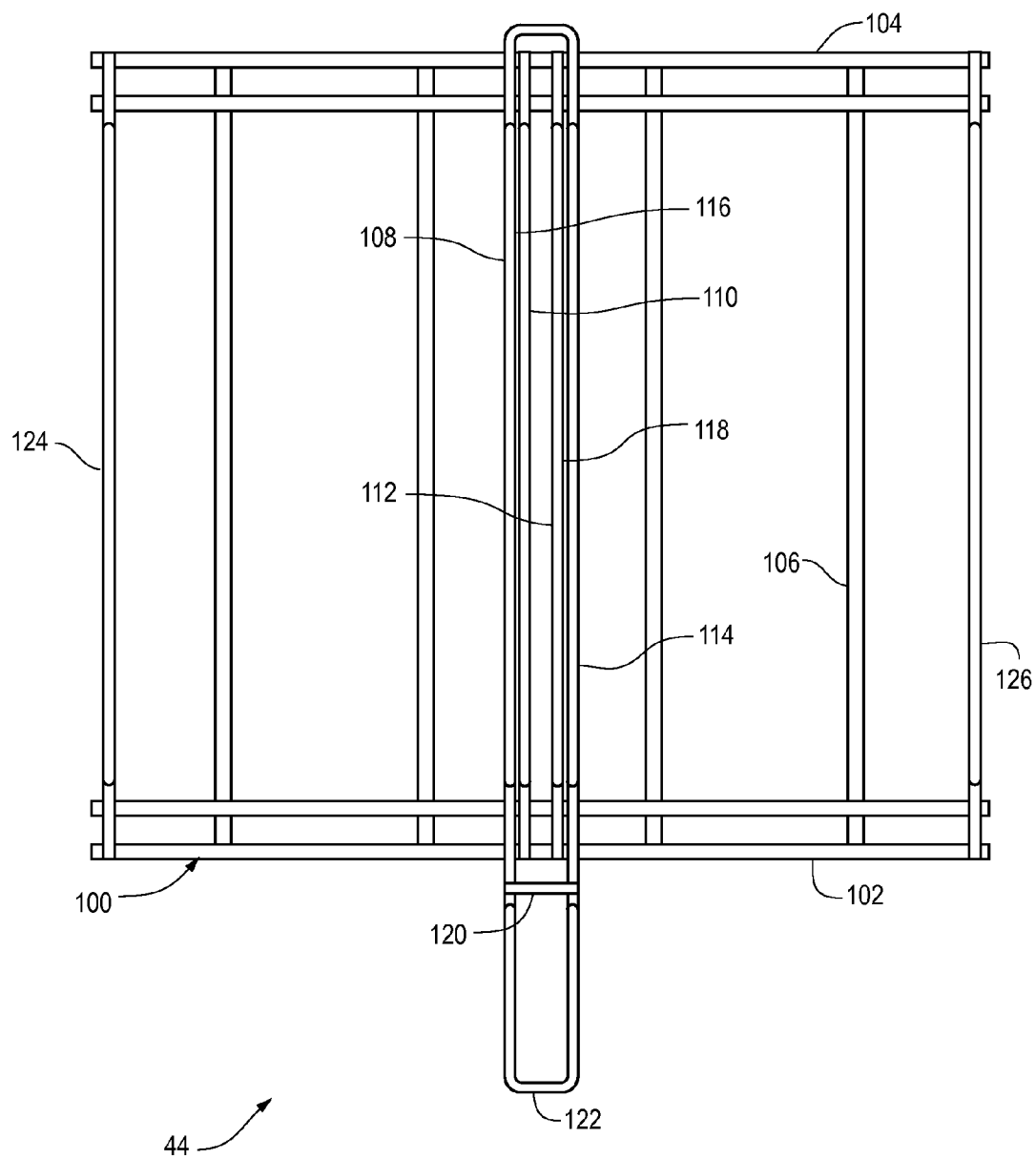
FIG. 4 is a top view of the rack of FIG. 2, in accordance with an exemplary embodiment.

FIGS. 2, 3, and 4 are isometric, front, and top views, respectively, of rack 44. In this example, rack 44 includes a frame 100 and various members extending upwardly from frame 100. Frame 100 may be mounted in compartment 24 as shown in FIG. 1, i.e., supported by mounting bracket 45. Alternatively, frame 100 may rest on lower compartment surface 34.

The front of frame 100 may be defined by one or more laterally-extending front members 102, and the back of frame 100 may be defined by one or more laterally-extending back members 104. Frame 100 may further include a plurality of cross-pieces 106 extending between front members 102 and back members 104. Alternatively, cross-pieces 106 could be omitted from frame 100, in which case trays 40 and 42 may rest on lower compartment surface 34 after sliding over front members 102.

Rack 44 may also include channel members 108, 110, 112, and 114 extending between front members 102 and back members 104. Channel members 108 and 110 define a first channel 116, and channel members 112 and 114 define a second channel 118. As described in more detail below, first channel 116 receives a vertical section of cover 46, and second channel 118 receives a vertical section of cover 48.

As best shown in FIGS. 2 and 3, channel members 108, 110, 112, and 114 may be configured as brackets that extend to a certain height above frame 100. In particular, channel members 108 and 114 may extend to a greater height above frame 100 than channel members 110 and 112.

Rack 44 may further include a stop 120 that blocks the front ends of channels 116 and 118. As best shown in FIG. 4, stop 120 may be provided as a bar that extends between channel members 108 and 114. A similar stop could also be provided to block the back ends of channels 116 and 118.

Channel members 108 and 114 may also extend in front of stop 120 to provide a handle 122. As shown in FIG. 1, handle 122 may extend out of the open front of compartment 24.

Rack 44 may also include side members 124 and 126 extending between front members 102 and back members 104. Side members 124 and 126 may cooperate with channel members 108 and 114 to laterally position 40 and 42 on rack 44. In particular, side member 124 and channel member 108 may define a space therebetween for receiving tray 40. Similarly, side member 126 and channel member 114 may define a space therebetween for receiving tray 42.

4. Exemplary Covers

Figure 5:
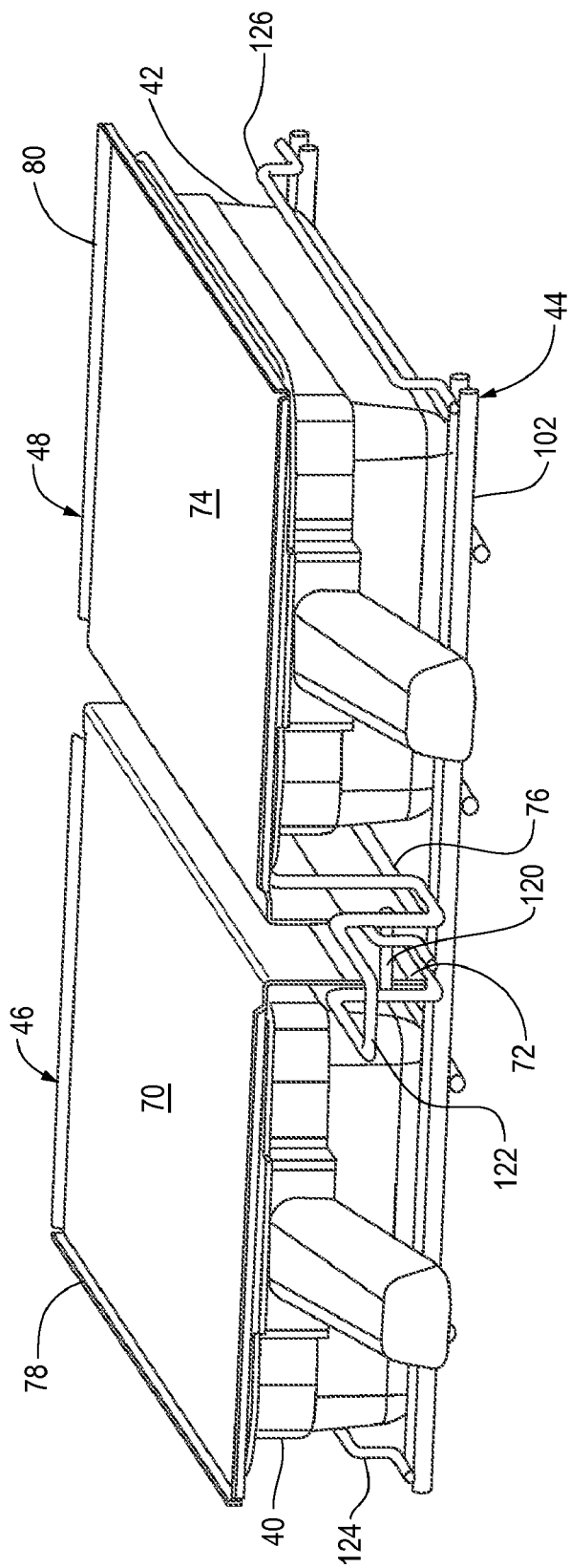
FIG. 5 is an isometric view of two covers and two trays, in combination with the rack of FIG. 2, in accordance with an exemplary embodiment.
Figure 6:
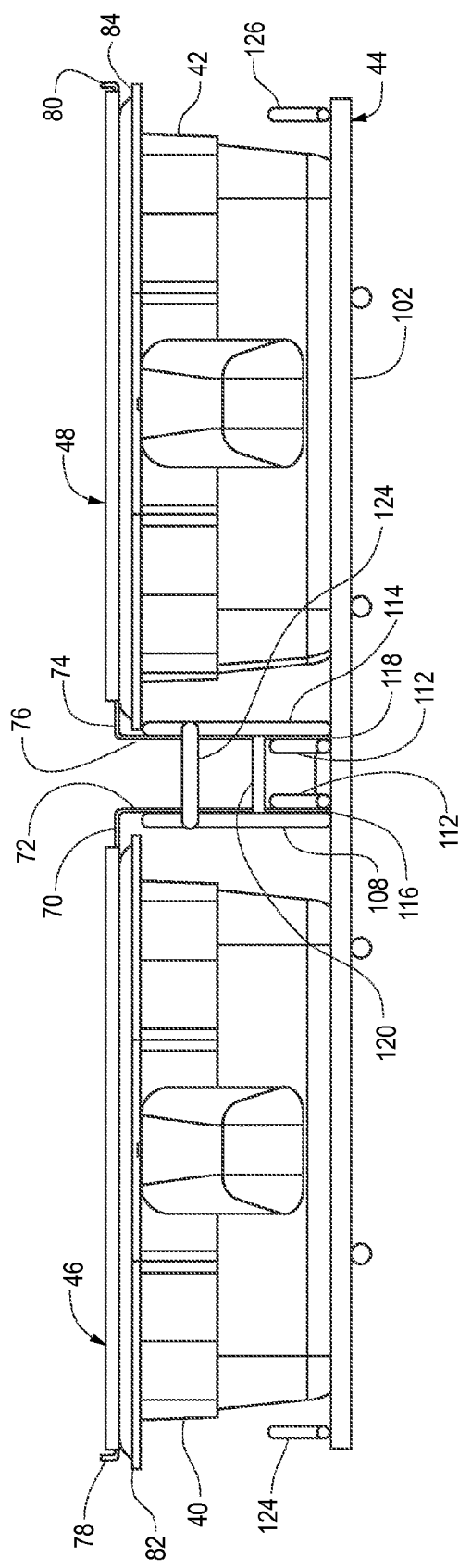
FIG. 6 is a front view of the combination of FIG. 5, in accordance with an exemplary embodiment.

FIGS. 5 and 6 are isometric and front views, respectively, of a combination in which trays 40 and 42 are supported by rack 44 and are covered by covers 46 and 48, respectively. Cover 46 has a horizontal section 70 and a vertical section 72 attached to and extending downwardly from one side of horizontal section 70. Cover 48 similarly has a horizontal section 74 and a vertical section 76 attached to and extending downwardly from one side of horizontal section 74.

Vertical sections 72 and 76 may be fitted into separate channels, e.g., with vertical section 72 in channel 116 and vertical section 76 in channel 118. When vertical sections 72 and 76 are in channels 118 and 118, respectively, they are also positioned behind stop 120.

In an exemplary embodiment, covers 46 and 48 are made out of a sheet material. The sheet material could be a metal, such as stainless steel, aluminum, or titanium, with a thickness ranging from about 0.024 inches to about 0.125 inches, depending on the type of metal. A metal cover could be anodized black or other color based, for example, on desired thermal characteristics. It is to be understood that covers 46 and 48 could also be made out of other materials, such as plastics (e.g., high temperature Nylon, polysulfone, polyimide, polyethersulfone, polyetherimide, or polyphenylene sulfide), depending on the operating temperatures that the covers experience.

To construct a cover out of a sheet material, a generally rectangular piece of the sheet material may be bent to an approximately 90 degree angle so as to define a generally rectangular horizontal section and a generally rectangular vertical section. The three free edges of the horizontal section may also be bent to provide additional stiffness. For example, horizontal section 70 of cover 46 may include turned-up edges 78 along three sides, and horizontal section 74 of cover 48 may include turned-up edges 80 along three sides, as best shown in FIG. 5. Preferably, turned-up edges 78 and 80 do not contact upper compartment surface 32 when covers 46 and 48 are in compartment 24.

In the configuration shown in FIGS. 5 and 6, covers 46 and 48 are supported by trays 40 and 42. In particular, tray 40 includes a lip 82 on which horizontal section 70 of cover 46 rests, and tray 42 includes a lip 84 on which horizontal section 74 of cover 48 rests. In addition, vertical sections 72 and 76 are in an upper position within channels 116 and 118, such that the lower edges of vertical sections 72 and 76 do not reach down to the level of front member 102, as best shown in FIG. 6.

Figure 7:
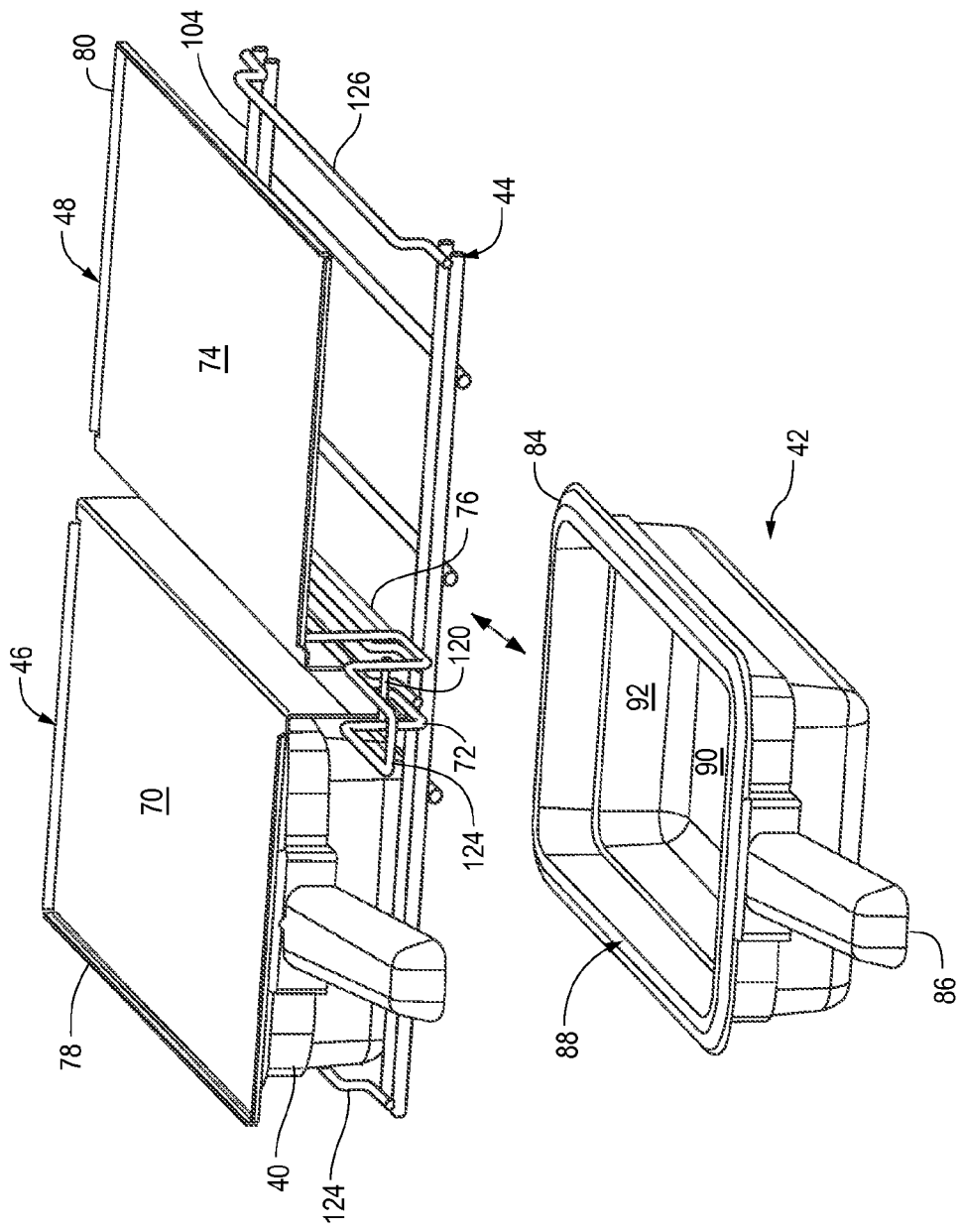
FIG. 7 is an isometric view of the combination of FIG. 5, with one of the trays removed, in accordance with an exemplary embodiment.
Figure 8:
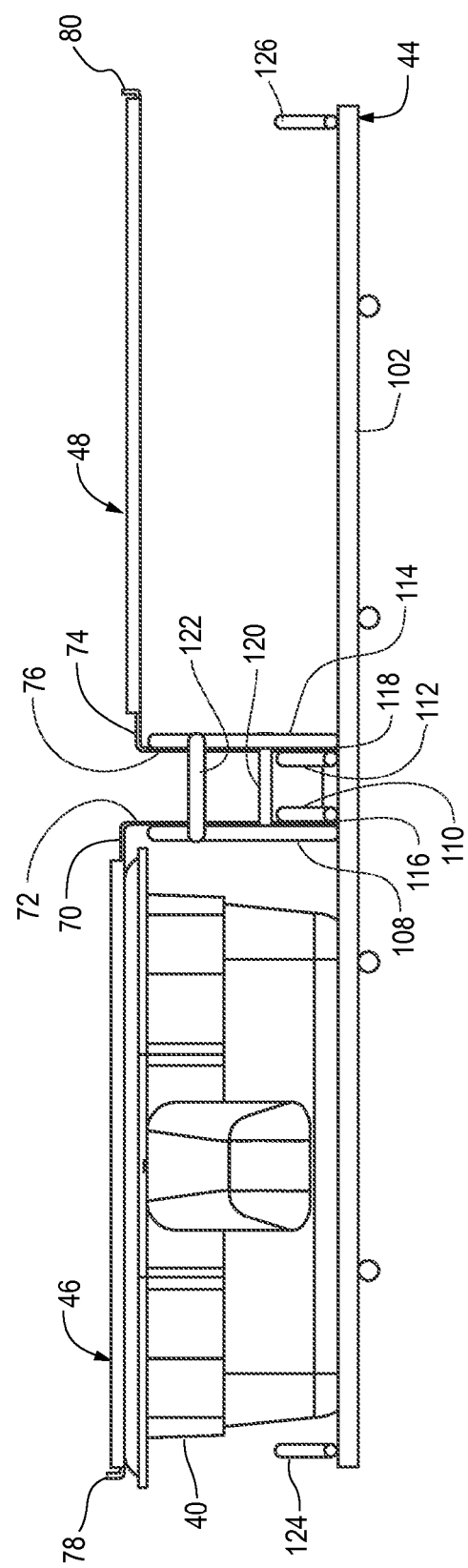
FIG. 8 is a front view of the combination of FIG. 5, with one of the trays removed, in accordance with an exemplary embodiment.

However, covers 46 and 48 change position when trays 40 and 42 are removed. For example, FIGS. 7 and 8 illustrate how the position of cover 48 changes when tray 42 is withdrawn from compartment 24. With tray 42 no longer supporting cover 48, vertical section 76 is in a lower position within channel 118 such that the lower edge of vertical section 76 rests on front member 102, as best shown in FIG. 8. In this configuration, rack 44 supports cover 48 substantially only through vertical section 76, due to vertical section 76 resting on front member 102 and due to the narrowness of channel 118 substantially preventing side-to-side motion of vertical section 76. In general, the width of channel 118 will depend on the thickness of vertical section 76. Preferably, vertical section 76 fits sufficiently tightly in channel 118 such that cover 48 does not tilt when supported in this way (i.e., such that vertical section 76 is substantially vertical and horizontal section 74 is substantially horizontal). Preferably, a gap remains between the top edge of channel member 114 and the underside of horizontal section 74, as best shown in FIG. 8. However, even if no such gap is present so that horizontal section 74 contacts channel member 114, rack 44 may still support cover 48 substantially only through vertical section 76.

When tray 42 is withdrawn, cover 48 stays in compartment 24 because of stop 120. In particular, when tray 42 is pulled forward, cover 48 may be pulled with it. However, the forward motion of cover 48 will be blocked when vertical section 76 in channel 118 reaches stop 120. In this way, stop 120 retains covers 46 and 48 in compartment 24.

In the configuration illustrated in FIGS. 7 and 8, cover 48 and rack 44 cooperatively define a receiving space into which tray 42 can be inserted. The receiving space is defined above by horizontal section 74, defined below by front member 102 and defined along the sides by channel member 114 and side member 126. However, the height of tray 42 is greater than the height of the receiving space, i.e., the distance between front member 102 and horizontal section 74. As a result, when tray 42 is inserted into the receiving space, cover 74 is pushed upward, so that vertical section 76 lifts off of front member 102. When tray 42 has been fully inserted, horizontal section 74 will again rest on lip 84, as shown in FIGS. 5 and 6.

The double-headed arrow in FIG. 7 shows the directions in which tray 42 may be inserted and withdrawn from under cover 48. Tray 42 may include a handle 86 to facilitate its movement in the directions indicated by the double-headed arrow. Also as shown in FIG. 7, lip 84 may surround a top opening 88 that provides access to the interior of tray 42. The interior of tray 42 defines a space that may be used to contain previously cooked food portions. The height of this interior space may be defined by the distance between a generally flat bottom wall 90 of tray 42 and the upper surface of lip 84. The sides of the interior space may be defined by four side walls 92 that extend between bottom wall 90 and lip 84.

5. Exemplary Method of Use

When tray 42 contains previously cooked food portions, tray 42 may be inserted under cover 48 in heating compartment 24 of food warming apparatus 10 in order to maintain the previously cooked food portions in a ready-to-use condition. In particular, heating compartment 24 may be heated to maintain the previously cooked food portions at a desired holding temperature, as described above. In addition, horizontal section 74 of cover 48 may, at least partially, block top opening 88 so as to restrict evaporation of liquid from the previously cooked food portions.

Tray 42 may be withdrawn from compartment 24 in order to use one or more of the previously cooked food portions, for example, to prepare a food item ordered by a customer. In particular, withdrawing tray 42 from compartment 24 allows an operator to access the previously cooked food portions through the top opening of tray 42.

Covers 46 and 48 may be periodically removed from compartment 24, for example, in order to clean them. To remove covers 46 and 48, trays 40 and 42 may first be withdrawn from compartment 24. Then, rack 44 may be pulled out of compartment 24, e.g., using handle 122, with covers 46 and 48 still mounted thereon. Once rack 44 has been withdrawn, covers 46 and 48 may be lifted off.

Trays 40 and 42, rack 44, and covers 46 and 48 may be assembled in compartment 24 in the following way. First, covers 46 and 48 are mounted on rack 44. More particularly, cover 46 is mounted by fitting vertical section 72 into channel 116 behind stop 120, and cover 48 is mounted by fitting vertical section 76 into channel 118 behind stop 120. With this configuration, rack 44 supports cover 46 substantially only through vertical section 72 and also supports cover 48 substantially only through vertical section 76.

Once covers 46 and 48 have been mounted in this way, rack 44 may be inserted into compartment 24 through the front opening, e.g., using handle 122, so that frame 100 is supported by lower compartment surface 34, by mounting bracket 45, or in some other way. Trays 40 and 42 may then be inserted into compartment 24 by sliding them over front member 102. After sliding over front member 102, trays 40 and 42 may drop to a lower position (e.g., so that they are resting on cross-pieces 106 or on lower compartment surface 34). In this way, front member 102 may provide a detent action that allows the user to feel when trays 40 and 42 are fully inserted in compartment 24. The insertion of trays 40 and 42 lifts up covers 46 and 48, as described above, to attain the configuration illustrated in FIGS. 5 and 6.

6. Additional Support Structures

Figure 9:
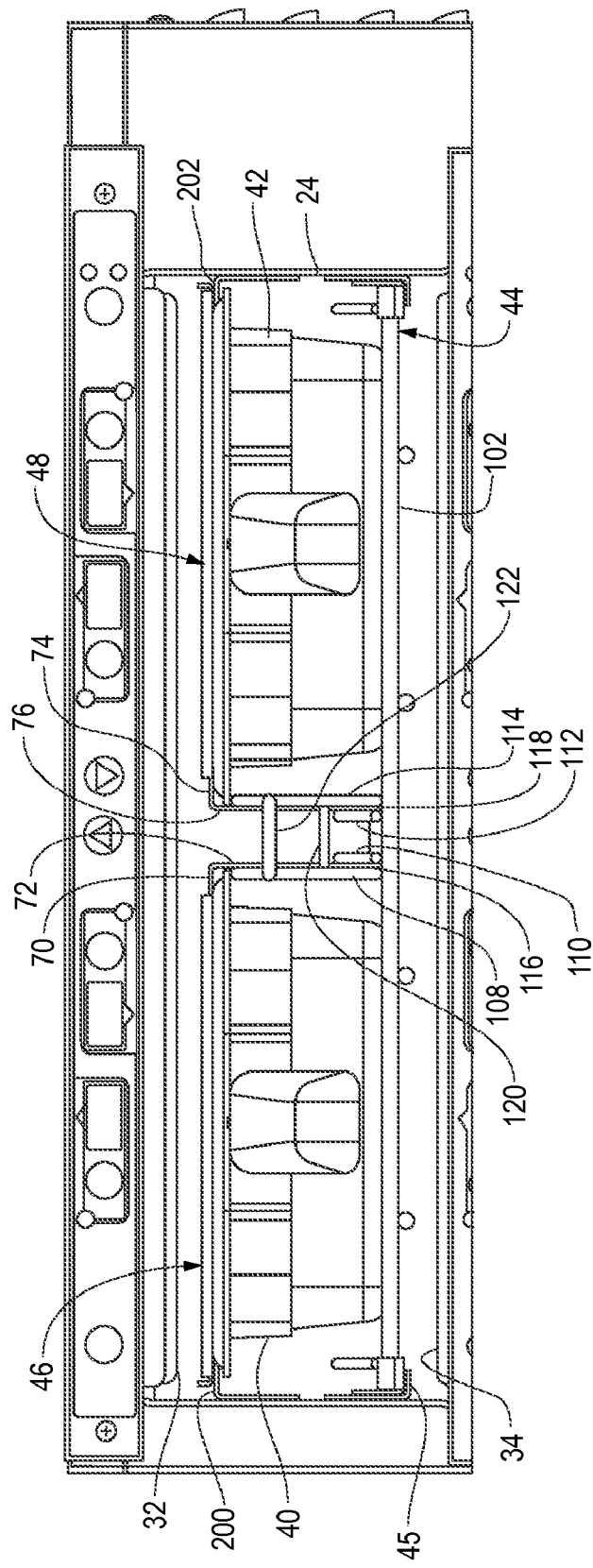
FIG. 9 is a front view of a heating compartment in which two trays are supported by a rack and the covers are supported by the rack and by additional support members, in accordance with an exemplary embodiment.

FIGS. 1-8 illustrate an embodiment in which the rack supports a cover substantially only through the cover's vertical section when the cover is not covering a tray. However, other support structures may also be used to support covers. FIG. 9 illustrates an embodiment in which support members 200 and 202 provide additional support for covers 46 and 48, respectively.

In this embodiment, rack 44 is supported in compartment 24 by mounting brackets 45 that are attached to the side walls of compartment 24. Rack 44, in turn, supports trays 40 and 42, as well as their corresponding covers 46 and 48. As before, rack 44 supports covers 46 and 48 substantially only through their vertical sections 72 and 76, which are disposed in channels 116 and 118, respectively. However, support members 200 and 202 may also provide support for covers 46 and 48.

Support members 200 and 202 may be configured as 90-degree angle brackets, each with a vertical side and a horizontal side. The vertical sides of support members 200 and 202 may be attached to the side walls of compartment 24 above mounting brackets 45. The horizontal sides of support members 200 and 202 may provide support surfaces for horizontal sections 70 and 74, respectively. For example, support members 200 and 202 may be placed at a height within compartment 24 such that they support covers 46 and 48, respectively, when trays 40 and 42 are in compartment 24. Thus, horizontal sections 70 and 74 may rest on support members 200 and 202 when trays 40 and 42 are present in compartment 24, as shown in FIG. 9. When trays 40 and 42 are withdrawn, covers 46 and 48 may tilt so that vertical sections 72 and 76 drop down to their lower positions (e.g., resting on front member 102) but with horizontal sections 70 and 74 still resting on support members 200 and 202.

Alternatively, support members 200 and 202 may be placed at a lower position in compartment 24. For example, support members 200 and 202 may be positioned such that horizontal sections 70 and 74 rest on support members 200 and 202, respectively, before trays 40 and 42 are inserted into compartment 24. Then, when trays 40 and 42 are inserted, horizontal sections 70 and 74 may be lifted off from support members 200 and 202 and instead rest on trays 40 and 42.

It is to be understood that the configuration of support members 200 and 202 shown in FIG. 9 and described above is exemplary only, as other types of support members may be used to provide support for covers in addition to the rack.

7. Conclusion

While certain features and embodiments of the present invention have been described in detail herein, it is to be understood that the invention encompasses all modifications and enhancements within the scope and spirit of the following claims.

What is claimed is:

1. A method for covering a tray in a food warming apparatus, said food warming apparatus including a heating compartment, said tray having a lip defining a tray opening, said method comprising:
   providing a rack that fits into said heating compartment;
   providing a cover for said tray, said cover having a horizontal section and a vertical section extending downwardly from one side of said horizontal section;
   mounting said cover on said rack such that said rack supports said cover substantially only through said vertical section, wherein said rack defines a channel for receiving said vertical section of said cover, and wherein mounting said cover on said rack comprises fitting said vertical section into said channel;
   inserting said rack with said cover mounted thereon into said heating compartment; and
   inserting said tray into a receiving space cooperatively defined by said cover and said rack until said horizontal section of said cover rests on said lip of said tray and at least partially blocks said tray opening.

2. The method of claim 1, wherein said rack includes a stop that blocks at least one end of said channel, and wherein fitting said vertical section into said channel comprises:
   positioning said vertical section behind said stop.

3. The method of claim 2, further comprising withdrawing said tray from said heating compartment such that said stop prevents said cover from being withdrawn from said heating compartment as said tray is being withdrawn.

4. The method of claim 3, wherein withdrawing said tray from said heating compartment comprises:
   said vertical section moving vertically in said channel from an upper position to a lower position.

5. The method of claim 4, wherein inserting said tray into a receiving space cooperatively defined by said cover and said rack comprises:
   said vertical section moving vertically in said channel from said lower position to said upper position.

6. The method of claim 1, further comprising:
   supporting said horizontal section by a support member separate from said rack.

* * * * *